(12) United States Patent
    Agarwal et al.

(10) Patent No.: US 12,657,038 B2
(45) Date of Patent: Jun. 16, 2026

(54) MEASUREMENT ERROR REDUCTION IN A PROCESS BUS SYSTEM

(71) Applicant: Siemens Aktiengesellschaft, Munich (DE)

(72) Inventors: Abhishek Agarwal, Bangalore (IN); Stefan Flemming, Roßtal-Buchschwabach (DE); Anjana A.R, Karnataka (IN); Igor Kogan, Berlin (DE); Christian Liedtke, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 63 days.

(21) Appl. No.: 18/715,212

(22) PCT Filed: Dec. 7, 2022

(86) PCT No.: PCT/EP2022/084764
    § 371 (c)(1),
    (2) Date: May 31, 2024

(87) PCT Pub. No.: WO2023/104873
    PCT Pub. Date: Jun. 15, 2023

(65) Prior Publication Data
    US 2025/0036427 A1     Jan. 30, 2025

(30) Foreign Application Priority Data
    Dec. 7, 2021    (EP) ..................................... 21212848

(51) Int. Cl.
    G06F 9/445         (2018.01)
(52) U.S. Cl.
    CPC ................................ G06F 9/44505 (2013.01)

(58) Field of Classification Search
    CPC .................................................... G06F 9/44505
    (Continued)

(56) References Cited

U.S. PATENT DOCUMENTS 4,888,771  A  *  12/1989  Benignus ............ G06F 11/2257
                                                         706/916
2002/0165636  A1 *  11/2002  Hasan .................... G05B 17/02
                                                         700/121
                        (Continued)

FOREIGN PATENT DOCUMENTS

JP         2014203138 A      10/2014
JP         2014217186 A      11/2014

OTHER PUBLICATIONS

PCT International Search Report & Written Opinion mailed Mar. 28, 2023 corresponding to PCT International Application No. PCT/EP2022/084764.
                        (Continued)

*Primary Examiner* — Paul R. Myers
(74) *Attorney, Agent, or Firm* — Schmeiser, Olsen & Watts LLP

(57) ABSTRACT

A method and device for reducing measurement error/s is provided. The method receives a file by an engineering tool from a system configurator tool and parses the file to identify a value associated with a transformer setting for a process bus device. The method fetches information from installation data to identify the value when the value is not identified in the file and stores the value in the engineering tool when the value is identified in the file or in the information. The method marks the value as a missing value to visually notify a technician when the value is not identified in the information or the file. The method publishes the value at a remote database for process bus subscriber device/s.

15 Claims, 20 Drawing Sheets

(58) Field of Classification Search
USPC ........................................................ 713/100
See application file for complete search history.

(56) References Cited

U.S. PATENT DOCUMENTS

| 2005/0015383 | A1* | 1/2005 | Harjanto | ............... | G06F 16/284 |
| 2017/0371497 | A1* | 12/2017 | Buvid | ................... | G06T 11/206 |
| 2020/0090361 | A1* | 3/2020 | Kim | ........................ | G06T 17/10 |

OTHER PUBLICATIONS

"Communication networks and systems for power utility automation—
Part 6: Configuration description language for Communication in
power utility automation systems related to IEDs", IEC 61850-
6:2009+AMD1:2018 CSV, IEC, 3, Rue De Varembe, PO Box 131,
CH-1211 Geneva 20, Switzerland, Jun. 7, 2018 (Jun. 7, 2018), pp.
1-269.

\* cited by examiner

-500

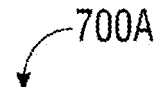

| Project | Edit | View | Insert | Online | Options | Tools | Windows | Help | BbpTestMenu |

Save project

| Project tree | ⊞ ◁ | Project156 |

Available devices

| | IEC 61850 name |
| Project156 | |
| Single-line configuration | |
| Add new device | |
| Devices and networks | |
| ▷ 7SL87 | ⊗ |
| ▷ 7SL87_1 | |
| ▽ IEC 61850 stations | |
| Add new device | |
| 158 | |

| Import specification | |

| Delete | Del |
| Rename | F2 |
| Cross-references | F11 |
| Properties... | Alt+Enter |
| Export changes to IEC 61850 System Configurator | |
| Import changes from IEC 61850 System Configurator | |
| Export all devices to IEC 61850 System Configurator | |
| Import all devices from IEC 61850 System Configurator | |

| Load configuration to de | |
| Load firmware to device | |
| Upgrade project devices | |
| Import project | |
| ▷ Documentation settings | |
| ▷ Languages & resources | |
| ▷ Online access | |

| Merging unit specific | Current measuring points | Voltage measuring points |
|---|---|---|

Measuring-point settings

Publisher assignment to measuring p

| | #1 | #2 | #3 | #4 | Primary [A] | Secondary [A] | Ratio (O) TCTR.Rat | MaxRMS | Clip [*Inom] (M) TCTR.Clip | Apply default values |
|---|---|---|---|---|---|---|---|---|---|---|
| | (All) ▷ | (All) ▷ | (All) ▷ | (All) ▷ | (All) | ▷ | (All) ▷ | (All) ▷ | (All) ▷ | |
| TCTR1 | | | | | o | o | o | o | o | |
| | TCTR2 | | | | o | o | o | o | o | Apply |
| | | TCTR3 | | | o | o | o | o | o | Apply |
| | | | TCTR4 | | o | o | o | o | o | Apply |
| | | | | | o | o | o | o | o | Apply |

Figure 7C:
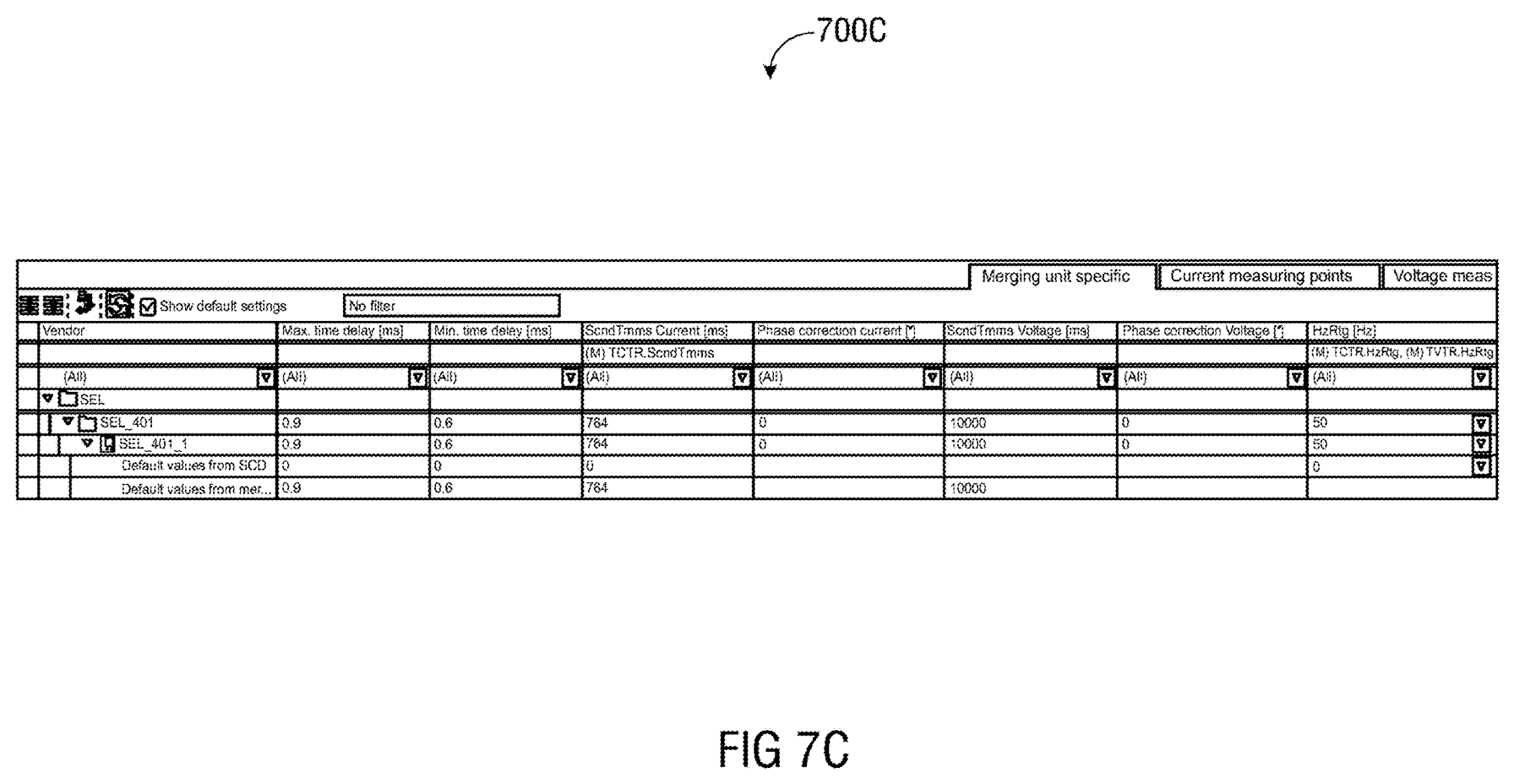

| | Max. time delay [ms] | Min. time delay [ms] | SendTmms Current [ms] (M) TCTR.SendTmms | Phase correction current [° | SendTmms Voltage [ms] (All) | Phase correction Voltage [° (All) | HzRtg [Hz] (M) TCTR.HzRtg, (M) TVTR.HzRtg |
|---|---|---|---|---|---|---|---|
| Vendor | | | | | | | |
| (All) | (All) | (All) | (All) | (All) | (All) | (All) | (All) |
| ▷ SEL | | | | | | | |
| ▷ SEL_401 | 0.9 | 0.6 | 764 | 0 | 10000 | 0 | 50 |
| ▷ SEL_401_1 | 0.9 | 0.6 | 764 | 0 | 10000 | 0 | 50 |
| Default values from SCD | 0 | 0 | 0 | | | | 0 |
| Default values from mer... | 0.9 | 0.6 | 764 | | 10000 | | 0 |

☑ Show default settings    No filter

Merging unit specific    Current measuring points    Voltage meas

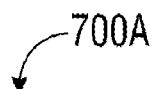

700A

| Project | Edit | View | Insert | Online | Options | Tools | Windows | Help | BbpTestMenu |

Save project

| Project tree | ⊞ ◁ | Project156 |

Available devices

| Project156 | | IEC 61850 name |
| Single-line configuration | | |
| Add new device | | |
| Devices and networks | | |
| ▷ 7SL87 | ⊗ | |
| ▷ 7SL87_1 | | |
| ▽ IEC 61850 stations | | |
| Add new device | | |
| 158 | | |
| Import specification | | |
| Load configuration to dev | | |
| Load firmware to devices | | |
| Upgrade project devices | | |
| Import project | | |
| ▷ Documentation settings | | |
| ▷ Languages & resources | | |
| ▷ Online access | | |

| Delete | Del |
| Rename | F2 |
| Cross-references | F11 |
| Properties... | Alt+Enter |
| Export changes to IEC 61850 System Configurator | |
| Import changes from IEC 61850 System Configurator | |
| Export all devices to IEC 61850 System Configurator | |
| Import all devices from IEC 61850 System Configurator | |

| Merging unit specific | Current measuring points | Voltage measuring points |

Measuring point settings

Publisher assignment to measuring p

| #1 | #2 | #3 | #4 | Primary [A] | Secondary [A] | Ratio (O) TCTR.Rat | MaxRMS | Clip [*Inom] (M) TCTR.Clip | Apply default values |
|---|---|---|---|---|---|---|---|---|---|
| (All) | (All) | (All) | (All) | (All) | (All) | (All) | (All) | (All) | |
| | | | | 0 | 0 | 0 | 0 | 0 | |
| TCTR1 | | | | 0 | 0 | 0 | 0 | 0 | Apply |
| | TCTR2 | | | 0 | 0 | 0 | 0 | 0 | Apply |
| | | TCTR3 | | 0 | 0 | 0 | 0 | 0 | Apply |
| | | | TCTR4 | 0 | 0 | 0 | 0 | 0 | Apply |

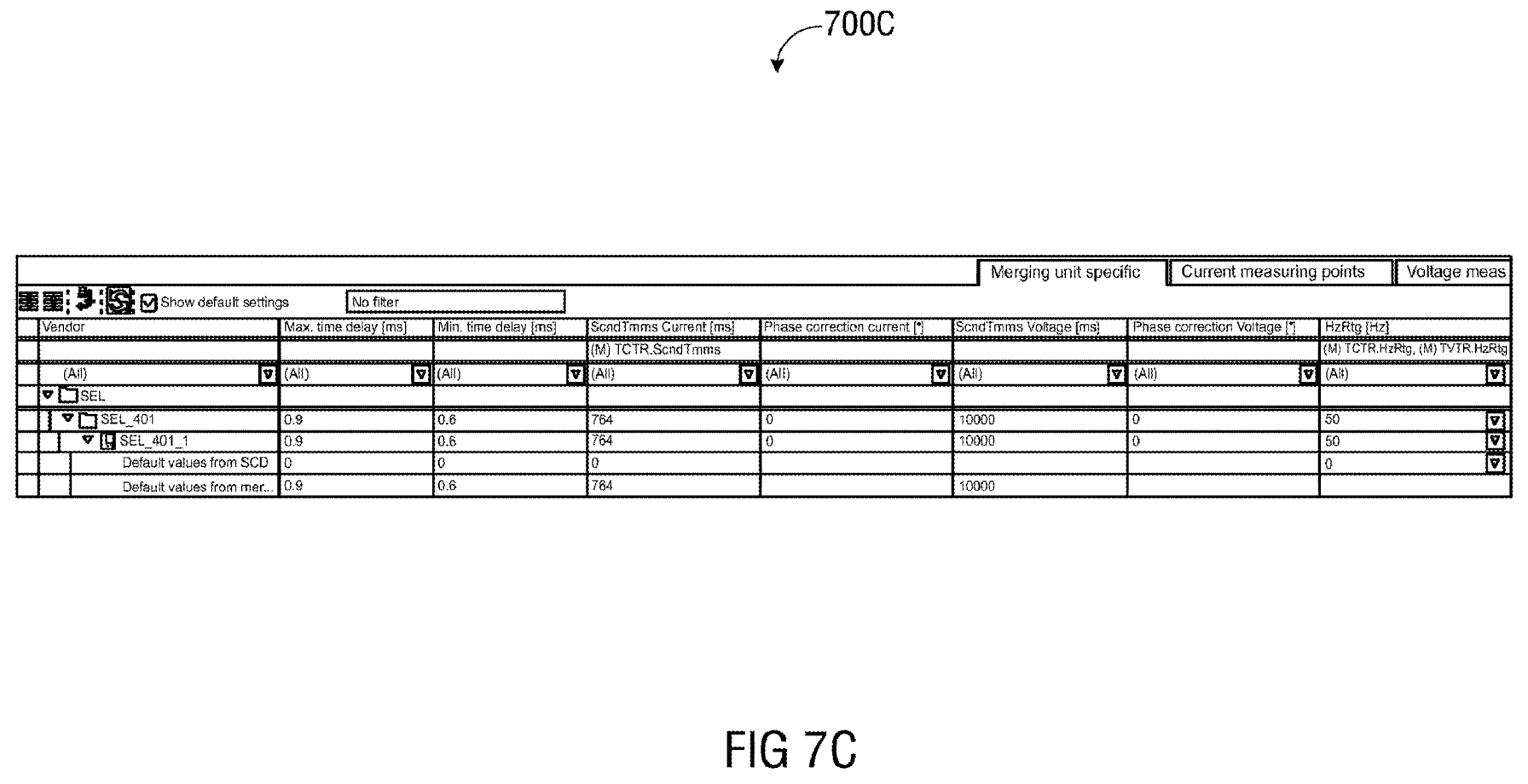

| Vendor | Max. time delay [ms] | Min. time delay [ms] | ScndTmms Current [ms] (M) TC.TR.ScndTmms | Phase correction current [°] | ScndTmms Voltage [ms] | Phase correction Voltage [°] | HzRtg [Hz] (M) TC.TR.HzRtg, (M) TV.TR.HzRtg |
|---|---|---|---|---|---|---|---|
| (All) ▽ | (All) ▽ | (All) ▽ | (All) ▽ | (All) ▽ | (All) ▽ | (All) ▽ | (All) ▽ |
| □ SEL | | | | | | | |
| ▽ □ SEL_401 | 0.9 | 0.6 | 764 | 0 | 10000 | 0 | 50 |
| ▽ □ SEL_401_1 | 0.9 | 0.6 | 764 | 0 | 10000 | 0 | 50 |
| Default values from SCD | 0 | 0 | 0 | | | | 0 |
| Default values from mer... | 0.9 | 0.6 | 764 | | 10000 | | |

No filter

Show default settings

Merging unit specific   Current measuring points   Voltage meas

FIG 7C

MEASUREMENT ERROR REDUCTION IN A PROCESS BUS SYSTEM

CROSS-REFERENCE TO RELATED APPLICATIONS

This application is a national stage of PCT Application No. PCT/EP2022/084764, having a filing date of Dec. 7, 2022, which claims priority to EP Application No. 21212848.2, having a filing date of Dec. 7, 2021, the entire contents both of which are hereby incorporated by reference.

FIELD OF TECHNOLOGY

The following relates to a process bus system, and more particularly to measurement error/s reduction in a process bus system by identifying transformer setting/s.

BACKGROUND

Currently, process bus solution relies on IEC 61850 edition 2.1 and IEC 61869 standards for providing setting/s to ensure maximal interoperability between process bus devices (such as merging devices, intelligent electronic devices (IEDs) etc.) of different vendors. For the vendors who are yet to support the full standard for these devices, a usual roundtrip process via an IEC 61850 system configurator tool could not be finished successfully, or one or more measurement errors occur during such operation. In embodiments, a measurement error is an error in measurement (current transformer, voltage transformer), due to synchronization issue between merging device/s and process bus client device/s. These measurement errors lead to maloperation of the protection function in the process bus client devices.

Further, IED capability description (ICD)/instantiated IED description (IID) files from the different vendors do not have crucial setting/s which are expected by proprietor device/s. In embodiments, a merging device from a specific vendor uses different hardware and analog-to-digital (AD) conversion approaches which eventually leads to different signals under transient conditions published via sampled values. This is addressed by a "ScndTmms" setting (i.e., specified secondary loop time constant in millisecond) in IEC Edition 2.1. If this particular setting is missing in the files, then this leads to a measurement error which further leads to mal operation of protection functions. In another example, if a sample rate setting is not found in the files, then this leads to an unspecified sample rate. Yet another example where a value of "MaxDl" setting (i.e., maximum processing delay time of samples) being too large leads to data delay error or increasing tripping times in case the value is too small. Also, when a subscriber IED (i.e., protection device) is not aware about a merging device specific behavior, then this leads to wrong reactions, for example, decisions pertaining to tripping of the circuit.

Furthermore, when a setting is missing or setting is not identified, then there is no visual aid available to a user (i.e., a technician) to help analyze a root cause of the issue. Thus, manual effort and technical expertise are required to understand the compatibility issues between the devices. In addition, specific settings like delay correction are usually not known in advance and are required to be calculated and calibrated during an engineering process by the technician. This leads to an additional effort in the engineering process.

In current scenarios, the procedure for identifying settings for the process bus device is done manually by the technician by performing the following procedure. Generic object-oriented substation event (GOOSE) and sampled measured value (SMV) signals are provisioned by a tool as either a publisher or a subscriber in a device specific software. Then, the IID Files are exported and then imported in the IEC 61850 configurator tool. Thereafter, the GOOSE and SMV signals are mapped and a SCD file is exported. The SCD file is then imported in the merging device and process-bus client devices to update the configuration by the mapping created in the IEC 61850 configurator tool.

Moreover, in order to perform the above-mentioned procedure, domain expertise is required to completely understand a correct value of settings that are applicable for the process bus system. Also, customer care support is needed in case the subscriber faces issues due to non-availability of the required settings in the merging units.

JP2014217186A discloses an electronic equipment such as an intelligent electronic device (IED) which operates in accordance with setting information generated by a setting device and includes acquisition means for acquiring the setting information; first storage means for storing function definition to be defined by the setting information of the electronic equipment; verification means for verifying whether or not the setting definition is defined in the setting information acquired by the acquisition means before the start of an operation; second storage means for, when it is verified that the function definition is defined in the setting information by the verification means, storing the setting information; and operation control means for, when it is verified that the function definition is not defined in the setting information by the verification means, controlling an operation in accordance with the setting information stored in the second storage means.

In light of the above, there is a need of a viable solution to reduce one or more measurement errors in a process-bus system by identifying transformer settings required for a process bus device. Further, there is also a need for marking missing setting/s and visually notifying a technician for the missing setting/s.

SUMMARY

An aspect relates to a method for reducing measurement error in a process bus system. In embodiments, the method comprises the steps of receiving a file by an engineering tool from a system configurator tool and parsing the file to identify a value associated with a transformer setting for a process bus device of the process bus system. In embodiments, the method also comprises the steps of fetching information from installation data to identify the value associated with the transformer setting when the value associated with the transformer setting is not identified in the file and storing the value associated with the transformer setting for the process bus device in the engineering tool when the value associated with the transformer setting is identified in the file or in the information fetched from the installation data. In embodiments, the method also comprises the step of marking the value as a missing value to visually notify a technician of the engineering tool when the value associated with the transformer setting for the process bus device is not identified in the information fetched from the installation data or in the file. In embodiments, the method also comprises the step of publishing the identified value associated with the transformer setting for the process bus device at a remote database for one or more process bus subscriber devices to reduce the measurement error.

In an embodiment, the file corresponds to a Substation Configuration Description (SCD) file.

In an embodiment, the installation data corresponds to global metadata file stored in the engineering tool.

In an embodiment, the transformer setting corresponds to a merging unit-specific transformer setting, a current measuring point transformer setting and/or a voltage measuring point transformer setting.

In an embodiment, the merging unit-specific transformer setting comprises a maximum time delay setting, a minimum time delay setting, a secondary loop time constant current setting, a phase correction current setting, a secondary loop time constant voltage setting, a rated frequency of current/voltage transformer setting and a phase correction voltage setting.

In an embodiment, the current measuring point transformer setting comprises a primary current transformer setting, a secondary current transformer setting, a ratio current transformer setting, a maximum measured value setting and a clipping limit setting.

In an embodiment, the voltage measuring point transformer setting comprises a primary voltage transformer setting, a secondary voltage transformer setting, a voltage reference setting, a ratio voltage transformer setting, a maximum measured value setting and a clipping limit setting.

In an embodiment, the information fetched from the installation data corresponds to a global metadata.

In an embodiment, the information from the installation data is fetched when a value associated with the merging unit-specific transformer setting is not identified in the file.

In an embodiment, the file is received by importing the file from the system configurator tool to the engineering tool.

In an embodiment, the missing value is marked to highlight the missing value for visually notifying the technician of the engineering tool.

In an embodiment, the identified value associated with the transformer setting for the process bus device are published at the remote database for building a database of recommended settings using the identified values associated with the transformer setting recommended by the process bus device.

In an embodiment, the one or more process bus subscriber devices uses the value associated with the transformer setting published at the remote database to update its own transformer setting.

The aspect of the present disclosure is also achieved by an engineering tool for reducing measurement error in a process bus system. The engineering tool comprises a receiver, a parser, a memory, a processor and a transmitter. The receiver is configured to receive a file by an engineering tool from a system configurator tool. The parser is configured to parse the file to identify a value associated with a transformer setting for a process bus device of the process bus system. The receiver is also configured to fetch information from installation data to identify the value associated with the transformer setting when the value associated with the transformer setting is not identified in the file. The memory is configured to store the value associated with the transformer setting for the process bus device in the engineering tool when the value associated with the transformer setting is identified in the file or in the information fetched from the installation data. The processor is configured to mark the value as a missing value to visually notify a technician of the engineering tool when the value associated with the transformer setting for the process bus device is not identified in the information fetched from the installation data or in the file. And the transmitter is configured to publish the identified value associated with the transformer setting for the process bus device at a remote database for one or more process bus subscriber devices to reduce the measurement error.

The aspect of the present disclosure is also achieved by a process bus client device. The process bus client device comprises a receiver, a parser, a memory, a processor and a transmitter. The receiver is configured to fetch information from installation data. The parser is configured to parse the information fetched from installation data to identify a value associated with a transformer setting for the process bus client device of the process bus system. The memory is configured to store the value associated with the transformer setting for the process bus client device when the value associated with the transformer setting is identified in the information fetched from the installation data. The processor is configured to mark the value as a missing value to visually notify a technician of an engineering tool when the value associated with the transformer setting for the process bus client device is not identified in the information fetched from the installation data and, the transmitter is configured to publish the identified value associated with the transformer setting for the process bus client device at a remote database for one or more process bus subscriber devices to reduce the measurement error.

Still other aspects, features, and advantages of embodiments of the invention are readily apparent from the following detailed description, simply by illustrating a number of particular embodiments and implementations, including the best mode contemplated for carrying out embodiments of the invention. Embodiments of the invention are also capable of other and different embodiments, and its several details can be modified in various obvious respects, all without departing from the scope of embodiments of the invention. Accordingly, the drawings and description are to be regarded as illustrative in nature, and not as restrictive.

BRIEF DESCRIPTION

Some of the embodiments will be described in detail, with reference to the following figures, wherein like designations denote like members, wherein:

FIG. 7A shows a screenshot for importing file from a system configurator tool using an engineering tool, in accordance with an embodiment of the present invention;

FIG. 7B shows a screenshot for one or more current measuring point settings in an engineering tool, in accordance with an embodiment of the present invention;

FIG. 7C shows a screenshot for depicting exemplary values associated with a merging device-specific transformer settings in an engineering tool, in accordance with an embodiment of the present invention.

DETAILED DESCRIPTION

Figure 1:
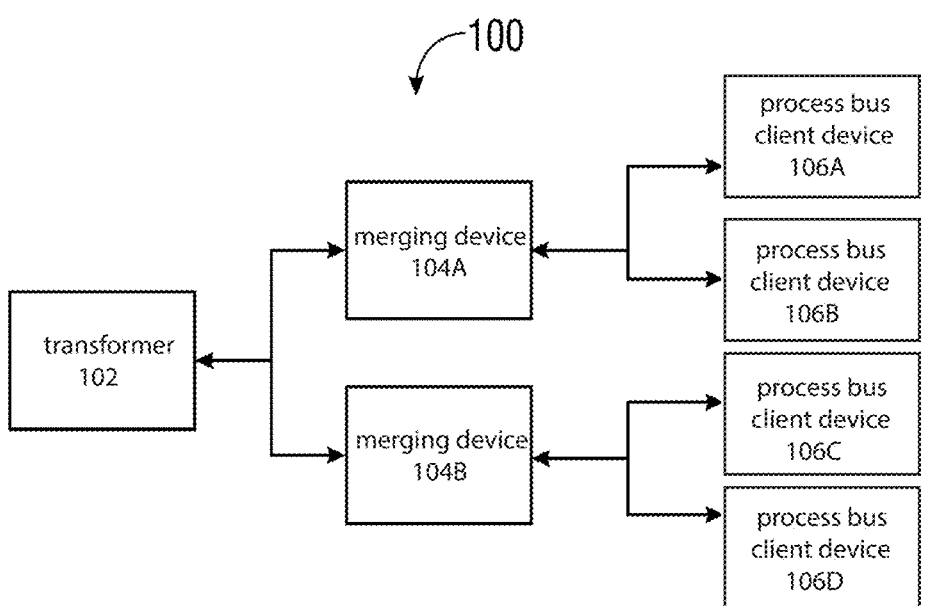
FIG. 1 shows a system architecture for a process bus system, in accordance with an embodiment of the present invention.

FIG. 1 is a system architecture for a process bus system 100, in accordance with an embodiment of the present invention. The process bus system 100 comprises, but is not limited to, a transformer 102 (may be a current transformer or a voltage transformer), one or more merging devices 104A-104B and one or more process bus client devices 106A-106D. Herein, the one or more merging devices 104A-104B and the one or more process bus client devices 106A-106D are collectively referred hereinafter as "process bus devices". Also, any one of these merging devices 104A-104B and the one or more process bus client devices 106A-106D is also referred to as "a process bus device".

The one or more merging devices 104A-104B has a first merging device 104A and a second merging device 104B. Both of the first merging device 104A and the second merging device 104B are connected to the transformer 102 through a wired network (i.e., a process bus). The process bus involves positioning the first merging device 104A and the second merging device 104B close to the transformer 102. Further, the one or more process bus client devices 106A-106D has a first process bus client device 106A and a second bus process client device 106B both connected to the first merging device 104A through a wired network (such as ethernet optical fiber cables etc.). Similarly, the one or more process bus client devices 106A-106D also has a third process bus client device 106C and a fourth process bus client device 106D both connected to the second merging device 104B through a wired network.

Although FIG. 1 shows two merging devices 104A-104B connected to the transformer 102, it is understood for a person skilled in the conventional art that only one merging device or any number of merging devices can be connected to the transformer 102 depending upon the requirements. Likewise, any number of process bus client devices 106A-106D can be connected to the merging devices 104A-104B depending upon the requirements.

Each of the merging devices 104A-104B record the measured values of the transformer 102, digitizes the recorded measured values and sends the digitized measured values to the one or more process bus client devices 106A-106D via a sampled measured values (SMV) data stream over the wired network. Each of the merging devices 104A-104B publish current-sampled and voltage-sampled values on a process-bus network according to the IEC 61850-9-2 and IEC 61869-9 standards. Further, the one or more process bus client devices 106A-106D allow a subscription of current-sampled and voltage-sampled values published by the merging devices 104A-104B complying with the IEC 61850-9-2 and IEC 61869-9 standards.

Figure 2:
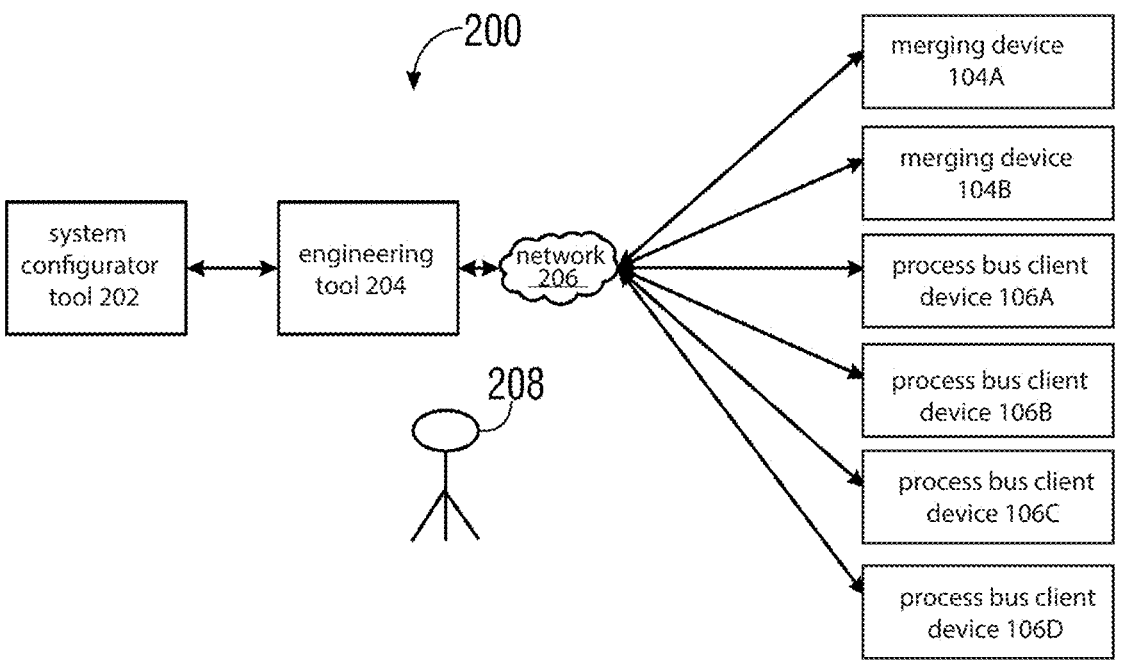
FIG. 2 shows a system diagram depicting communication between a system configurator tool, an engineering tool and one or more process bus devices of the process bus system, in accordance with an embodiment of the present invention.

FIG. 2 is a system diagram 200 depicting communication between a system configurator tool 202, an engineering tool 204 and one or more process bus devices 104A-104B, 106A-106D, in accordance with an embodiment of the present invention. In the present examples, the system configurator tool 202 is provided by the IEC standard and is used to subscribe required current transformer (CT) and voltage transformer (VT) inputs of the one or more process bus devices 104A-104B, 106A-106D to signals published by the merging devices 104A-104B.

Further, the engineering tool 204 is a configuration and operation tool for the one or more process bus devices 104A-104B, 106A-106D. Using the engineering tool 204, a technician/user 208 can create system topologies, configure hardware and communication networks, set function settings and perform many further tasks related to the one or more process bus devices 104A-104B, 106A-106D. Herein, using the engineering tool 204 by the technician 208, the one or more process bus devices 104A-104B, 106A-106D may be either configured as a merging device or a process-bus client device (i.e., intelligent electronic device, IED). Also, all the configuration and one or more setting/s performed by the technician 208 for the one or more process bus devices 104A-104B, 106A-106D through the engineering tool 204 may be communicated and transmitted to a remote database for publishing through a network 206 (as explained in FIG. 5 below).

Moreover, the system configurator tool 202 and the engineering tool 204 may also communicate with each other through a wired or a wireless network (not shown). Such communication is needed for performing import functions, export functions and other functions as needed. In an embodiment, the export from the engineering tool 204 to the system configurator tool 202 provides CT and VT output channels of the merging devices 104A, 104B and the required CT and VT input channels for the one or more process-bus client devices 106A-106D. Interconnect these channels in the system configurator tool 202. In an embodiment, the import from the system configurator tool 202 to engineering tool 204 provides the interconnections between merging devices 104A, 104B and the process-bus client devices 106A-106D for the whole substation. The engineering tool 204 extracts the mapping from the process-bus client device 106A-106D of the current device project and updated parameters for the merging devices.

Figure 3:
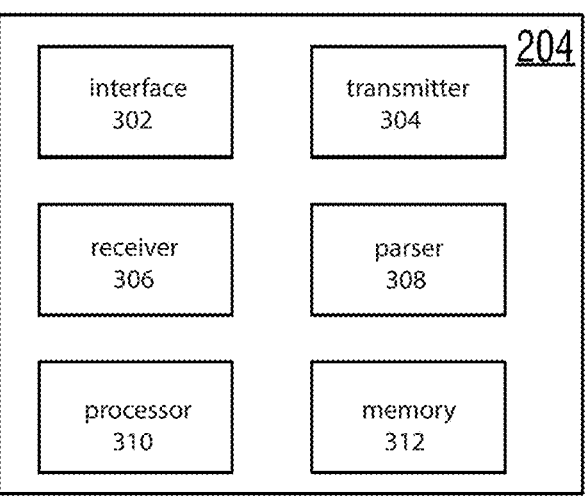
FIG. 3 shows a block diagram of an engineering tool, in accordance with an embodiment of the present invention.

FIG. 3 is a block diagram of an engineering tool 204, in accordance with an embodiment of the present invention. The engineering tool 204 comprises, but is not limited to, an interface 302, a transmitter 304, a receiver 306, a parser 308, a processor 310 and a memory 312.

A technician 208 uses the interface 302 of the engineering tool 204 to import a file from the system configurator tool 202. For this, the technician 208 first selects a process bus device (say merging device 104A) from the process bus devices 104A-104B, 106A-106D of the process bus system 100. Herein, the technician 208 first selects the process bus device 104A in the interface 302 of the engineering tool 204 for which the file is to be imported. After selecting the process bus device 104A, the technician 208 selects an option "Import changes from IEC 61850 System Configurator" (shown in FIG. 7A below) in the interface 302 of the engineering tool 204 to import the file for the process bus device 104A from the system configurator tool 202. In an embodiment, the file corresponds to a Substation Configuration Description (SCD) file. In embodiments, the SCD file describes a version of a process bus device 104A. A SCD file contains information regarding a network structure of the process bus device 104A, an assignment of the process bus device 104A to a primary equipment and a substation-internal communication.

When the technician 208 selects the option "Import changes from IEC 61850 System Configurator" in the interface 302 of the engineering tool 204, the transmitter 304 of the engineering tool 204 is configured to transmit a request to the system configurator tool 202 to send the file for the process bus device 104A. Then, the system configurator tool 202 transmits the file to the engineering tool 204 and thereby, the engineering tool 204 receives the file from the system configurator tool 202.

The receiver 306 of the engineering tool 204 is configured to receive the file for the process bus device 104A from the system configurator tool 202. The parser 308 of the engineering tool 204 is configured to parse the file to identify a value associated with a transformer setting for the process bus device 104A. For this, the parser 308 checks each and every field (or description) of the file to identify the value associated with the transformer setting for the process bus device 104A.

In one embodiment, the transformer setting for the process bus device 104A corresponds to a merging device-specific transformer setting, a current measuring point transformer setting and/or a voltage measuring point transformer setting. Further, the merging device-specific transformer setting comprises a maximum time delay setting, a minimum time delay setting, a secondary loop time constant current setting, a phase correction current setting, a secondary loop time constant voltage setting, a rated frequency of current/voltage transformer setting, a phase correction voltage setting. Furthermore, the current measuring point transformer setting comprises a primary current transformer setting, a secondary current transformer setting, a ratio current transformer setting, a maximum measured value setting and a clipping limit setting. Moreover, the voltage measuring point transformer setting comprises a primary voltage transformer setting, a secondary voltage transformer setting, a voltage reference setting, a ratio voltage transformer setting, a maximum measured value setting and a clipping limit setting.

Table 1 below shows exemplary contents of the file (i.e., the SCD file). This exemplary file is related to the merging device-specific transformer setting. Although the contents of the file is shown in a tabular format; but any other format is also within the scope of the present disclosure.

TABLE 1

| Merging Device-Specific Transformer Setting | Value |
|---|---|
| Max. time delay [ms] | 0.9 ms (M) LPHD · MaxDI (i.e., maximum processing delay time of samples (typically in microseconds, ms) |
| Min. time delay [ms] | 0.6 ms |
| Secondary loop time constant current [ms] | 764 ms |
| Phase correction current [°] | 0 |
| Secondary loop time constant voltage [ms] | 10000, TVTR · ScndTmms (i.e., Specified secondary loop time constant in millisecond) |
| HzRtg (i.e., Rated frequency of current/ voltage transformer) | 50 Hertz (Hz) (M) TCTR · HzRtg (M) TVTR · HzRtg |
| Phase correction voltage [°] | 0 |

As can be seen in Table 1 above, the file comprises a value for a maximum time delay setting, a minimum time delay setting, a secondary loop time constant current setting, a secondary loop time constant voltage setting and a rated frequency of the merging device-specific transformer setting. However, a value for a phase correction current setting and a phase correction voltage setting are missing or not present in the file.

Table 2 below shows exemplary contents of the file (i.e., the SCD file). This exemplary file is related to the current measuring point transformer setting.

TABLE 2

| Current Measuring Point Transformer Setting | Value |
|---|---|
| Primary [KV] | 0 (M) TCTR · Artg OR(M) TVTR · Vrtg |
| Secondary [V] | 0 |
| Ratio Current Transformer | 0 (O) TCTR · Rat |
| MaxRMS (i.e., setting for verification of the clip value. Automatically calculated from the primary rated value and the clip value, shows the max. measured value, non-editable) | 0 |
| Clip [*Vnom] (i.e., Ratio of the clipping limit of the instantaneous value to the rated primary value multiplied with a square root of two) | 0(M) TCTR · Clip OR(M) TVTR · Clip |

As another example of the file shown in Table 2 above, the file does not comprise any value for the current measuring point transformer setting. Thus, the value for each of the current measuring point transformer setting is missing or not present in the file as per Table 2.

For parsing the file, the parser 308 of the engineering tool 204 first checks if the file has a transformer setting related to a merging device-specific transformer setting, a current measuring point transformer setting or a voltage measuring point transformer setting. If the file has the transformer setting related to the merging device-specific transformer setting, then the parser 308 of the engineering tool 204 further looks or searches for a value associated with that merging device-specific transformer setting for the process bus device 104A in the file. If the value associated with the merging device-specific transformer setting for the process bus device 104A is found/identified in the file, the memory 312 of the engineering tool 204 stores the value associated with the merging device-specific transformer setting for the process bus device 104A. Considering the Table 1 above, value associated with few of the merging device-specific transformer settings are found in the file.

If the value associated with the merging device-specific transformer setting for the process bus device 104A is not found/identified in the file, the receiver 306 of engineering tool 204 is configured to fetch information from installation data. And, when the value associated with the merging device-specific transformer setting for the process bus device 104A is identified in the information from the installation data, the memory 312 of the engineering tool 204 stores the value associated with the merging device-specific transformer setting for the process bus device 104A in the engineering tool 204. Furthermore, in an embodiment, the information fetched from the installation data corresponds to a global metadata. Herein, the global metadata has value/s associated with merging device-specific transformer setting.

In an embodiment, the installation data corresponds to global metadata file stored in the engineering tool 204. Herein, the global metadata file stored in the engineering tool 204 is a global merging device setting database. This global merging device setting database contains all the recommended merging device specific settings, for different third-party vendor devices. The information in the installation data has same fields as of the contents of the file as explained in Table 1 above.

In a scenario where the value associated with the merging device-specific transformer setting for the process bus device 104A is not identified in the installation data and the file received from the system configurator tool 202, the processor 310 of the engineering tool 204 is configured to mark the value as a "missing value" (i.e., a value for a setting not found for the merging device-specific transformer setting in both the file and the installation data). Further, the processor 310 of the engineering tool 204 marks the missing value to visually notify the technician 208 of the engineering tool 204. In an embodiment, the marking of the missing value is done to highlight the missing value which will provide visual aid the technician 208 of the engineering tool 204. The missing value can be highlighted with a color (for an example, red color) in the engineering tool 204. Considering the Table 1 above, a value associated with a maximum time delay setting, a minimum time delay setting, a secondary loop time constant current setting, a secondary loop time constant voltage setting, and a rated frequency of the merging device-specific transformer setting are identified and stored. However, a value for a phase correction current setting and a phase correction voltage setting are marked as "missing values for setting/s".

Furthermore, if the file has the transformer setting related to the current measuring point transformer setting or the voltage measuring point transformer setting, then the parser 308 of the engineering tool 204 further looks or searches for a value associated with the current measuring point transformer setting or the voltage measuring point transformer setting for the process bus device 104A in the file. If the value associated with the current measuring point transformer setting or the voltage measuring point transformer setting for the process bus device 104A is found in the file, the memory 312 of the engineering tool 204 is configured to store the value associated with the current measuring point transformer setting or the voltage measuring point transformer setting for the process bus device 104A.

In a scenario where the value associated with the current measuring point transformer setting or the voltage measuring point transformer setting for the process bus device 104A is not identified in the file received from the system configurator tool 202, the processor 310 of the engineering tool 204 is configured to mark the value as a "missing value" (i.e., a value for a setting not found for the current measuring point transformer setting or the voltage measuring point transformer setting in the file). Considering the Table 2 above, value associated with all of the current measuring point transformer settings are not found/present in the file.

Further, the processor 310 of the engineering tool 204 is also configured to mark the missing value associated with the current measuring point transformer setting or the voltage measuring point transformer setting (for an example, red) to visually notify the technician 208 of the engineering tool 204. In an embodiment, the missing value is marked to highlight the missing value to visually notify the technician 208 of the engineering tool 204. In embodiments, a color (i.e., red color) may be used to highlight the missing value. Considering the Table 2 above, since the value associated with all of the current measuring point transformer setting are not found/present in the file, all of the current measuring point transformer setting are marked as "missing value/s for setting/s".

After the identified value associated with the transformer setting for the process bus device 104A is stored in the memory 312 of the engineering tool 204, the technician 208 of the engineering tool 204 uses the interface 302 of the engineering tool 204 to publish the identified value associated with the transformer setting for the process bus device 104A at a remote database for one or more process bus subscriber devices to reduce measurement error/s. This has been explained in FIG. 5 below.

Figure 4:
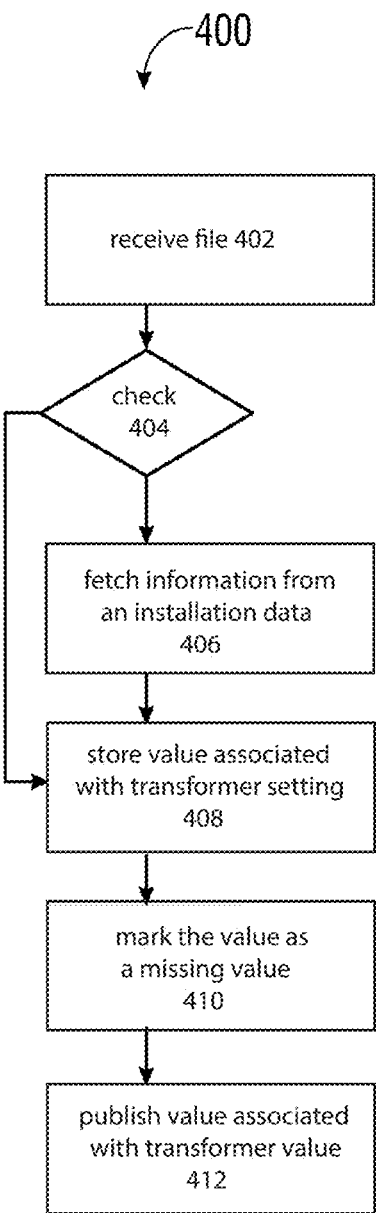
FIG. 4 shows a method diagram for reducing measurement error by identifying one or more value associated with setting/s for a process bus device, in accordance with an embodiment of the present invention.

FIG. 4 is a method diagram 400 for reducing measurement error in a process bus system 100 by identifying one or more transformer setting/s for a process bus device 104A, in accordance with an embodiment of the present invention. In embodiments, the method 400 at step 402 receives file by an engineering tool 204 from a system configurator tool 202. In order to receive the file, the engineering tool 204 imports the file from the system configurator tool 106 as explained in FIG. 3 above.

At step 404, the engineering tool 204 parses the file to identify a value associated with a transformer setting for a process bus device 104A. As explained in FIG. 3 above, the engineering tool 204 first checks if the value associated with a merging device-specific transformer setting, a current measuring point transformer setting or a voltage measuring point transformer setting is identified in the file. If the value associated with the merging device-specific transformer setting, the current measuring point transformer setting or the voltage measuring point transformer setting is identified in the file, then the method 400 moves to step 408. If the value associated with the merging device-specific transformer setting is not identified in the file, then the method 400 moves to step 406.

At step 406, the engineering tool 204 fetches information from an installation data to identify the value associated with the merging device-specific transformer setting when the value associated with the merging device-specific transformer setting is not identified in the file. And, in an embodiment, the information fetched from the installation data corresponds to a global metadata. In an embodiment, the installation data corresponds to global metadata file stored in the engineering tool 204.

At step 408, the engineering tool 204 stores the value associated with the transformer setting (i.e., merging device-specific transformer setting, current measuring point transformer setting or the voltage measuring point transformer setting) for the process bus device 104A in the engineering tool 204 when the value associated with the transformer setting is identified in the file or when the value associated with the transformer setting is identified in the information fetched from the installation data. In other words, the identified value associated with the transformer setting is stored in a memory 312 of the engineering tool 204.

At step 410, the engineering tool 204 marks the value as a missing value to visually notify a technician 208 of the engineering tool 204 when the value associated with the transformer setting for the process bus device 104A is not identified in the information fetched from the installation data or in the file. In embodiments, if the value associated with the current measuring point transformer setting or the voltage measuring point transformer setting is not identified in the file, then the engineering tool 204 marks the value associated with the current measuring point transformer setting or the voltage measuring point transformer setting as "missing values". And, if the value associated with the merging device-specific transformer setting is not identified in the information fetched from the installation data, then the engineering tool 204 marks the value associated with the merging device-specific transformer setting as "missing values". In an embodiment, the missing value is marked to highlight the missing value to visually notify q technician 208 of the engineering tool 204. In embodiments, a color (red, green or any other color) may be used to highlight the missing value.

At step 412, the engineering tool 204 publishes the identified value associated with the transformer setting for the process bus device 104A at a remote database for one or more process bus subscriber devices to reduce the measurement error. This has been explained in FIG. 5.

Figure 5:
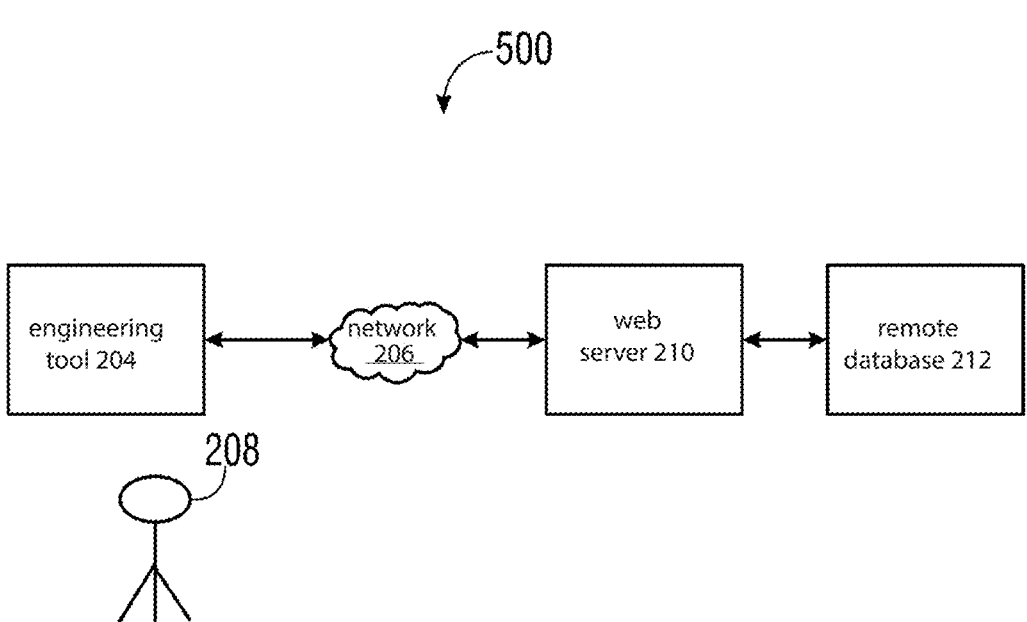
FIG. 5 shows a system diagram depicting storage of identified setting/s from an engineering tool to a remote database, in accordance with an embodiment of the present invention.

FIG. 5 is a system diagram depicting storage of identified setting/s from an engineering tool 204 to a remote database 212, in accordance with an embodiment of the present invention. After the identified value associated with the transformer setting for the process bus device 104A is stored in a memory 312 of the engineering tool 204, a technician 208 of the engineering tool 204 use an interface 302 of the engineering tool 204 to communicate with a web server 210 through a network 106 for transmitting the stored value associated with the transformer setting for the process bus device 104A from the engineering tool 204 to the web server 210. The web server 210 is in turn in communication with a remote database 212 (such as, a cloud or a storage blob). The web server 210 then transmits the identified value associated with the transformer setting for the process bus device 104A to the remote database 212. At the remote database 212, the identified value associated with the transformer setting for the process bus device 104A is published for one or more subscriber devices. Herein, the process bus device 104A is a publisher of recommended setting/s (i.e., the value associated with the transformer setting) at the remote database 212. Further, the identified value associated with the transformer setting for the process bus device are published at the remote database 212 for building a database of recommended settings using the identified values associated with the transformer setting recommended by the process bus device 104A.

In an embodiment, the one or more subscriber devices 104B, 106A-106D corresponds to a device (such as merging device or an IED) which has subscribed for values from the process bus device 104A. On availability of the published values associated with the transformer setting for the process bus device 104A on the remote database 212, the one or more subscriber devices updates its own transformer setting (i.e., a value associated with their setting) using the published values associated with the transformer setting for the process bus device 104A.

Embodiments of the present invention further enable the technician 208 to manually measure, calculate, validate, and fill-in "missing value" associated with a transformer setting in the engineering tool 204. There are the missing value as marked by the engineering tool 204 when a value associated with a transformer setting is not identified in the file or the information fetched from the installation data as explained above in FIG. 3. These manually calculated and filled-in value/s are then published at the remote database 212 for the one or more subscriber devices.

Figure 6:
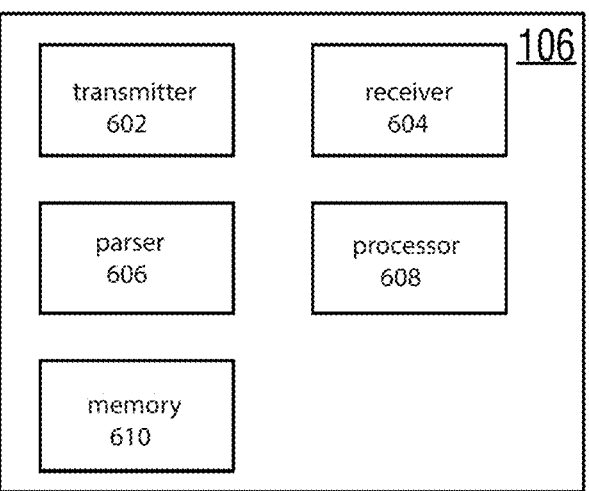
FIG. 6 shows a block diagram of a process bus client device, in accordance with an embodiment of the present invention.

FIG. 6 is a block diagram of a process bus client device 106, in accordance with an embodiment of the present invention. The process bus client device 106 comprises, but is not limited to, a transmitter 602, a receiver 604, a parser 606, a processor 608 and a memory 610. The present disclosure encompasses the process bus client device 106A-106D (collectively referred as 106) that identifies values associated with transformer setting for reducing measurement error/s.

The receiver 604 of the process bus client device 106 is configured to fetch information from installation data. In an embodiment, the installation data corresponds to global metadata file stored in a memory 610 of the process bus client device 106. Herein, the information fetched information from installation data has same kind of content as that of the SCD file, explained in FIG. 3 above.

The parser 606 of the process bus client device 106 is configured to parse the information fetched from installation data to identify a value associated with a transformer setting for the process bus client device 106 of the process bus system 100. For this, the parser 606 first checks if the information has a transformer setting related to a merging device-specific transformer setting, a current measuring point transformer setting or a voltage measuring point transformer setting. If the information has the transformer setting related to the merging device-specific transformer setting, then the parser 606 further looks or searches for a value associated with the merging device-specific transformer setting for the process bus client device 106 and, if the information has a transformer setting related to a current measuring point transformer setting or a voltage measuring point transformer setting, then the parser 606 further looks or searches for a value associated with the current measuring point transformer setting or the voltage measuring point transformer setting for the process bus client device 106. If the value associated with the transformer setting for the process bus client device 106 is found in the information fetched from the installation data, the memory 610 of the process bus client device 106 stores the value associated with the transformer setting for the process bus client device 106.

In a scenario where the value associated with the transformer setting for the process bus client device 106 is not identified in the information fetched from the installation data, the processor 608 of the process bus client device 106 is configured to mark the value as a "missing value" (i.e., a value for a setting not found for the transformer setting in the installation data). Further, the processor 608 of the process bus client device 106 marks the missing value to visually notify the technician 208 of an engineering tool 204. In an embodiment, the marking of the missing value is done to highlight the missing value which will provide visual aid the technician 208 of the engineering tool 204. The missing value can be highlighted with a color (for an example, red color) in the engineering tool 204.

After the identified value associated with the transformer setting for the process bus client device 106 is stored in the memory 610 of the process bus client device 106, the process bus client device 106 publishes the identified value associated with the transformer setting for the process bus client device 106 at a remote database for one or more process bus subscriber devices to reduce measurement error/s as explained in FIG. 5 above.

FIG. 7A is a screenshot 700A for importing file from a system configurator tool 202 using an engineering tool 204, in accordance with an embodiment of the present invention. As can be seen, in an interface 302 of the engineering tool 204, an option of "Import changes from IEC 61850 system configurator" is displayed. On selecting the option of "Import changes from IEC 61850 system configurator" in the engineering tool 204, the file can be received in the engineering tool 204 for any of the process bus devices 104A-104B, 106A-106D.

FIG. 7B is a screenshot 700B for one or more current measuring point settings in an engineering tool 204, in accordance with an embodiment of the present invention. As depicted in FIG. 7B, the engineering tool 204 parses the file (having value/s associated with the current measuring point setting/s as per Table 2 as explained in FIG. 3 above). In this example, there are no values associated with the current measuring point setting/s or the value/s are missing in the file. Thus, in this scenario, the engineering tool 204 does not identify any value/s associated with the one or more current measuring point settings such as a primary current transformer setting, a secondary current transformer setting, a ratio current transformer (CT) setting, a maximum measured value setting and a clipping limit setting) for any of the process bus devices 104A-104B, 106A-106D (in this case, 7SL87). Thereby, the screenshot in FIG. 7B shows value "zero" (i.e., 0) for each of the one or more current measuring point settings.

FIG. 7C is a screenshot 700C for depicting exemplary values associated with a merging device-specific transformer setting in an engineering tool 204, in accordance with an embodiment of the present invention. As depicted in FIG. 7C, the engineering tool 204 parses the file (having value/s associated with merging device-specific transformer setting as per Table 1 as explained in FIG. 3 above). In this example, the file comprises a value for a maximum time delay setting, a minimum time delay setting, a secondary loop time constant current setting, a secondary loop time constant voltage setting, and a rated frequency of the merging device-specific transformer setting. However, a value for a phase correction current setting, and a phase correction voltage setting of the merging device-specific transformer setting are missing (i.e., has value "zero" (i.e., 0)) or not present in the file. Thus, in this scenario, the engineering tool 204 identifies value/s associated with the maximum time delay setting, the minimum time delay setting, the secondary loop time constant current setting, and the rated frequency. After, the engineering tool 204 stores these values in its memory 312. The screenshot 700C of the engineering tool 204 in FIG. 7C shows a value of 0.9 ms for the maximum time delay setting, a value of 0.6 ms for the minimum time delay setting, a value of 764 ms for the secondary loop time constant current setting, a value of 10000 ms for the secondary loop time constant voltage setting and a value of 50 Hz for the rated frequency of the merging device-specific transformer setting.

Figure 7D:
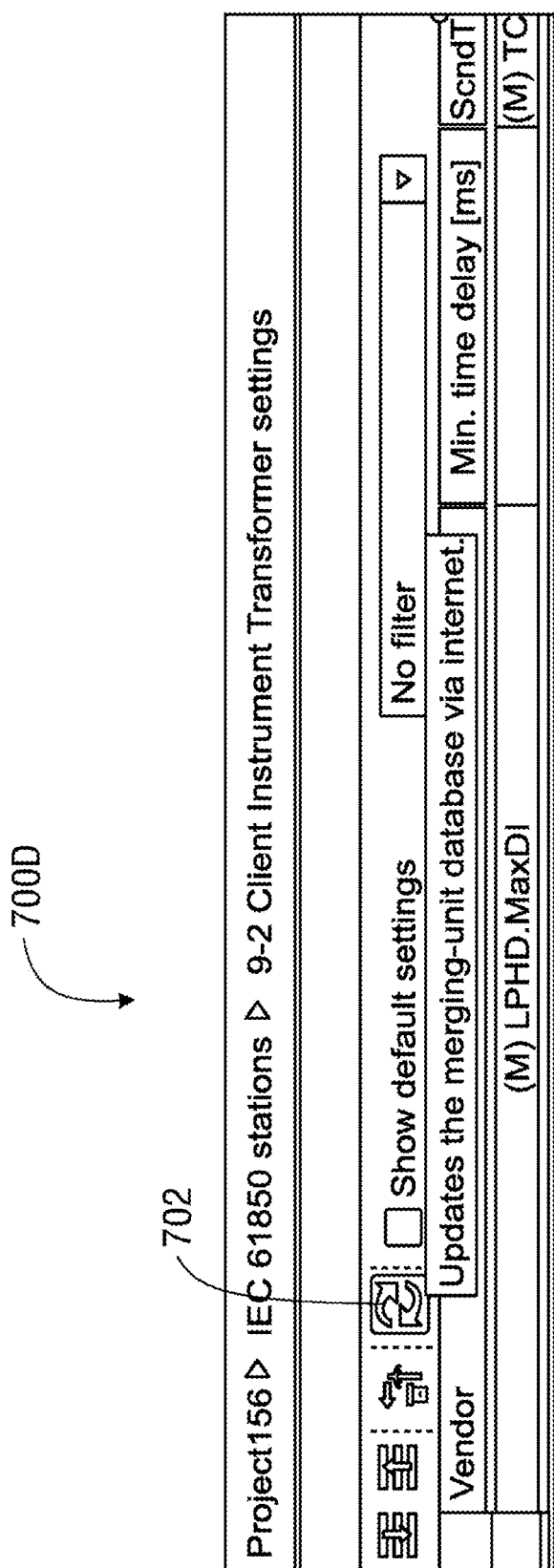
FIG. 7D shows a screenshot for publishing value/s associated with a setting using an engineering tool, in accordance with an embodiment of the present invention.
Figure 1:
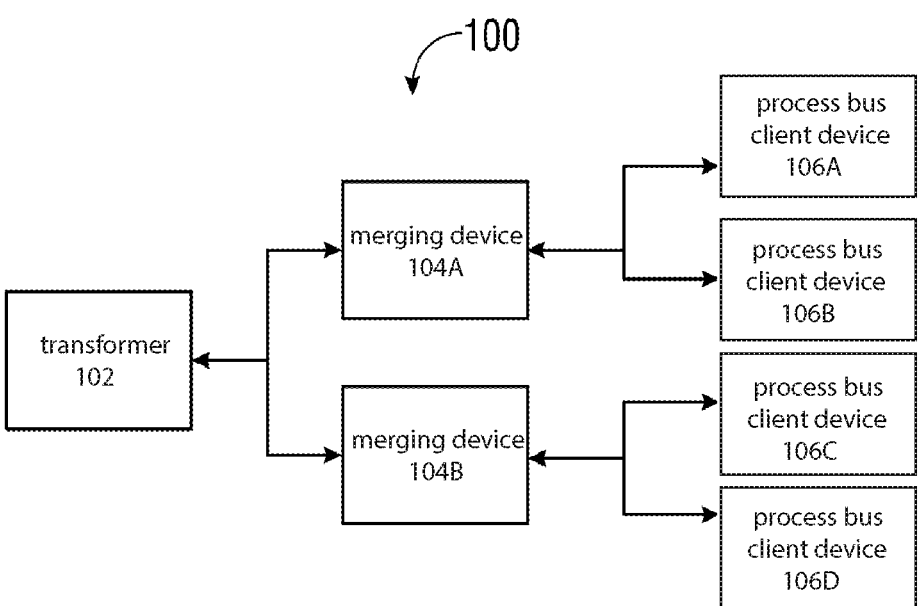
Figure 2:
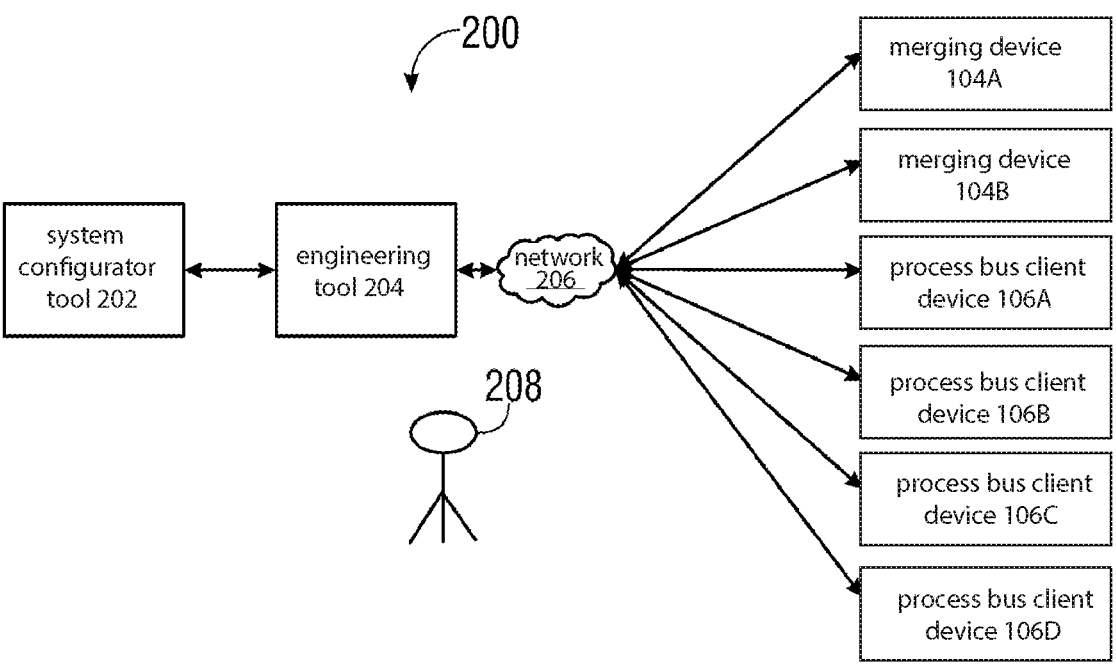
Figure 3:
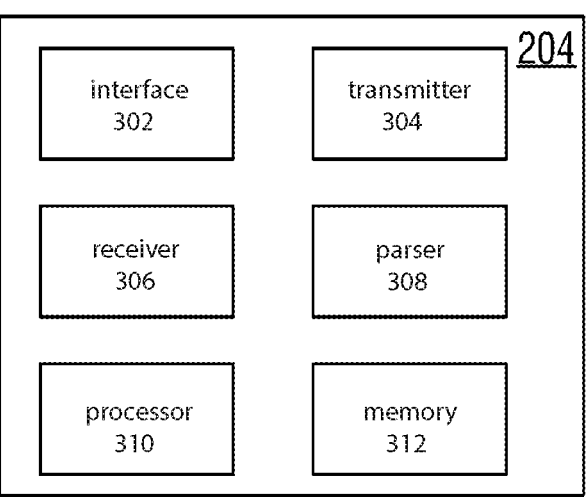
Figure 4:
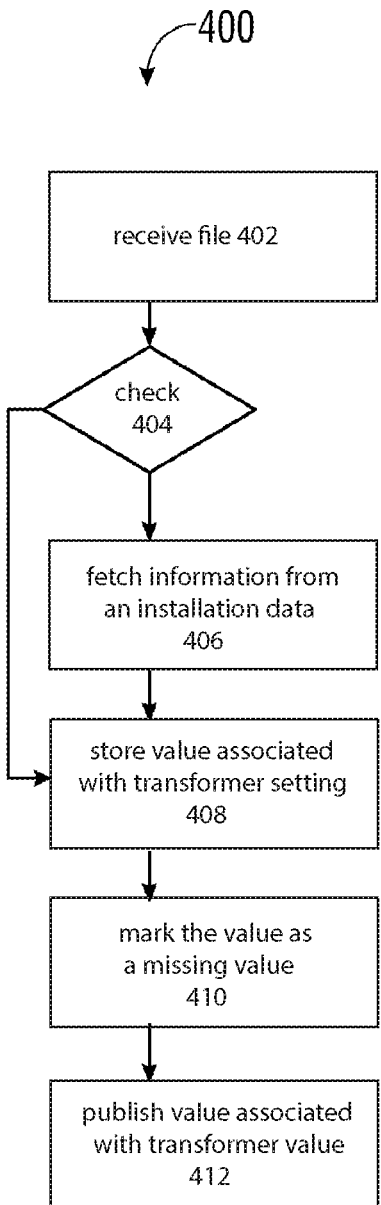
Figure 5:
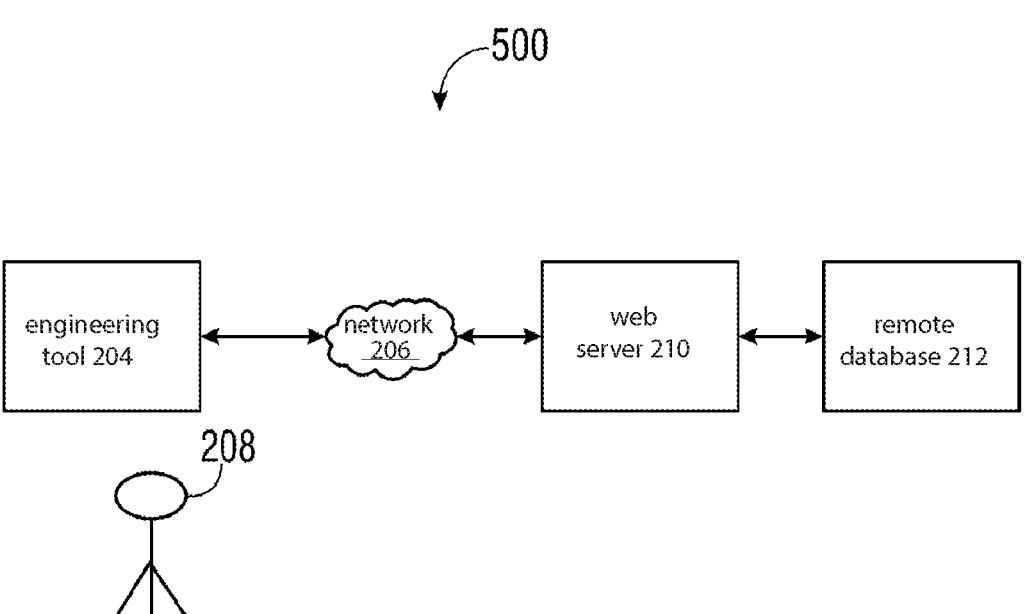
Figure 6:
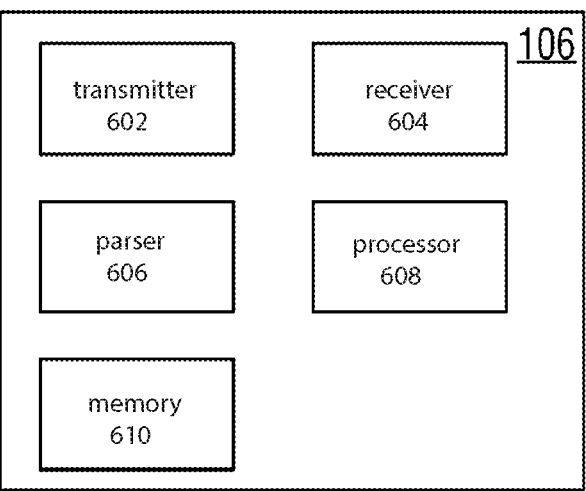
Figure 7D:
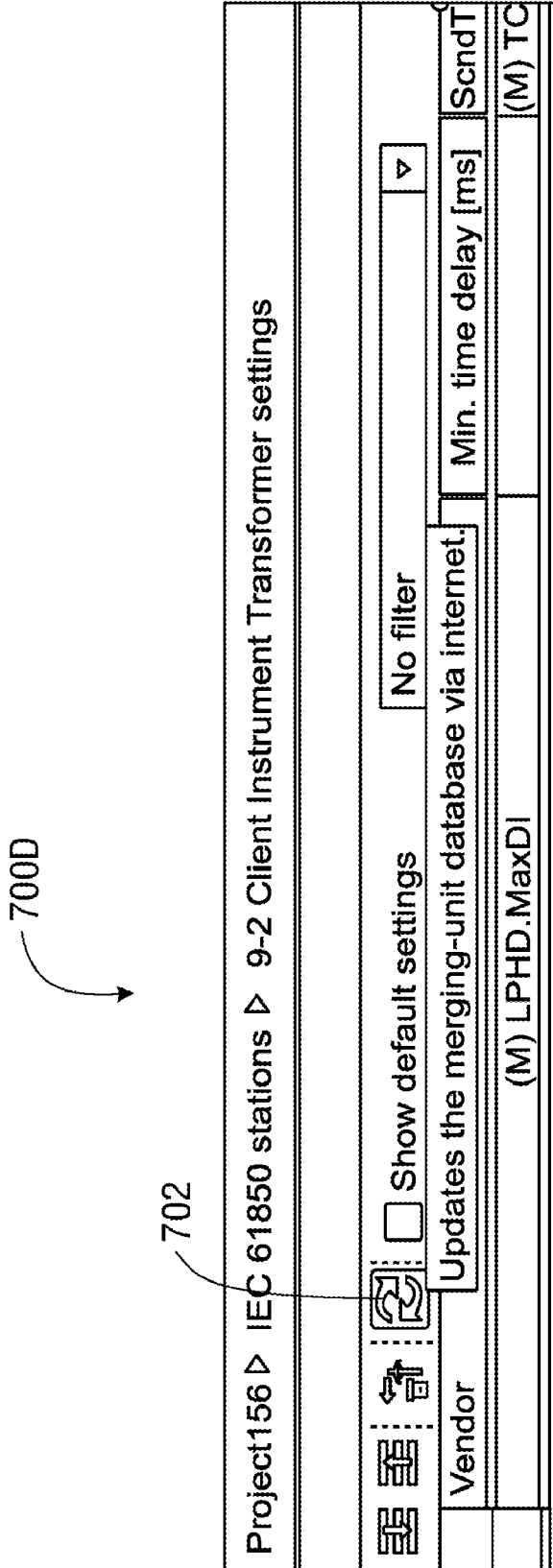

FIG. 7D is a screenshot 700D for publishing value/s associated with a setting using an engineering tool 204, in accordance with an embodiment of the present invention. As can be seen, an icon 702 can be used to publish updates (value/s associated with a setting) to a remote database 212 (in this case, a merging device database) for other one or more subscriber devices who can use these updated or published value/s associated with the transformer setting for themselves, as explained in FIG. 5 above.

Embodiments of the present invention offer the following technical advantages: (a) avoids manual procedure for identifying missing value associated with a transformer setting for a process bus device, (b) marks missing value and highlights for providing visual aid to a technician, (c) minimizes measurement errors in a process bus system, (d) reduces errors as well as time involved in carrying out the analysis in case of missing value/s as the complete process is carried out in the background, (e) provides recommended value for transformer settings to save the engineering time and enhance the efficiency of the system. Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for reducing measurement error in a process bus system, the method comprising:
   receiving a file by an engineering tool from a system configurator tool;
   parsing the file to identify a value associated with a transformer setting for a process bus device of the process bus system;
   fetching information from installation data to identify the value associated with the transformer setting when the value associated with the transformer setting is not identified in the file;
   storing the value associated with the transformer setting for the process bus device in the engineering tool when the value associated with the transformer setting is identified in the file or in the information fetched from the installation data;
   marking the value as a missing value to visually notify a technician of the engineering tool when the value associated with the transformer setting for the process bus device is not identified in the information fetched from the installation data or in the file; and
   publishing the identified value associated with the transformer setting for the process bus device at a remote database for one or more process bus subscriber devices, wherein the one or more process bus subscriber devices uses the value associated with the transformer setting published at the remote database to update a transformer setting for reducing the measurement error.

2. The method according to claim 1, wherein the file corresponds to a Substation Configuration Description (SCD) file.

3. The method according to claim 1, wherein the installation data corresponds to global metadata file stored in the engineering tool.

4. The method according to claim 1, wherein the transformer setting corresponds to a merging unit-specific transformer setting, a current measuring point transformer setting and/or a voltage measuring point transformer setting.

5. The method according to claim 4, wherein the merging unit-specific transformer setting comprises a maximum time delay setting, a minimum time delay setting, a secondary loop time constant current setting, a phase correction current setting, a secondary loop time constant voltage setting, a rated frequency of current/voltage transformer setting and a phase correction voltage setting.

6. The method according to claim 4, wherein the current measuring point transformer setting comprises a primary current transformer setting, a secondary current transformer setting, a ratio current transformer setting, a maximum measured value setting and a clipping limit setting.

7. The method according to claim 4, wherein the voltage measuring point transformer setting comprises a primary voltage transformer setting, a secondary voltage transformer setting, a voltage reference setting, a ratio voltage transformer setting, a maximum measured value setting and a clipping limit setting.

8. The method according to claim 1, wherein the information fetched from the installation data corresponds to a global metadata.

9. The method according to claim 1, wherein the information from the installation data is fetched when a value associated with a merging unit-specific transformer setting is not identified in the file.

10. The method according to claim 1, wherein the file is received by importing the file from the system configurator tool to the engineering tool.

11. The method according to claim 1, wherein the missing value is marked to highlight the missing value for visually notifying the technician of the engineering tool.

12. The method according to claim 1, wherein the process bus device corresponds to an intelligent electronic device or a merging unit in the process bus system.

13. The method according to claim 1, wherein the identified value associated with the transformer setting for the process bus device is published at the remote database for building a database of recommended settings using the identified values associated with the transformer setting.

14. An engineering tool for reducing measurement error in a process bus system, wherein the engineering tool is capable of configuring one or more process bus subscriber devices and comprises:

a receiver configured to receive a file by the engineering tool from a system configurator tool;

a parser configured to parse the file to identify a value associated with a transformer setting for a process bus device of the process bus system;

the receiver configured to fetch information from installation data to identify the value associated with the transformer setting when the value associated with the transformer setting is not identified in the file;

a memory configured to store the value associated with the transformer setting for the process bus device in the engineering tool when the value associated with the transformer setting is identified in the file or in the information fetched from the installation data;

a processor configured to mark the value as a missing value to visually notify a technician of the engineering tool when the value associated with the transformer setting for the process bus device is not identified in the information fetched from the installation data or in the file; and a transmitter configured to publish the identified value associated with the transformer setting for the process bus device at a remote database for the one or more process bus subscriber devices, wherein the one or more process bus subscriber devices uses the value associated with the transformer setting published at the remote database to update its own transformer setting for reducing the measurement error.

15. A process bus client device for reducing measurement error in a process bus system, the process bus client device comprising:

a receiver configured to fetch information from installation data;

a parser configured to parse the information fetched from installation data to identify a value associated with a transformer setting for the process bus client device of the process bus system;

a memory configured to store the value associated with the transformer setting for the process bus client device when the value associated with the transformer setting is identified in the information fetched from the installation data;

a processor configured to mark the value as a missing value to visually notify a technician of an engineering tool when the value associated with the transformer setting for the process bus client device is not identified in the information fetched from the installation data; and a transmitter configured to publish the identified value associated with the transformer setting for the process bus client device at a remote database for one or more process bus subscriber devices, wherein the one or more process bus subscriber devices uses the value associated with the transformer setting published at the remote database to update its own transformer setting for reducing the measurement error.

* * * * *